Oct. 14, 1941.  E. P. CRESSLER  2,258,883
RINSER FOR TEETH AND GUMS
Filed Feb. 21, 1938   2 Sheets-Sheet 1
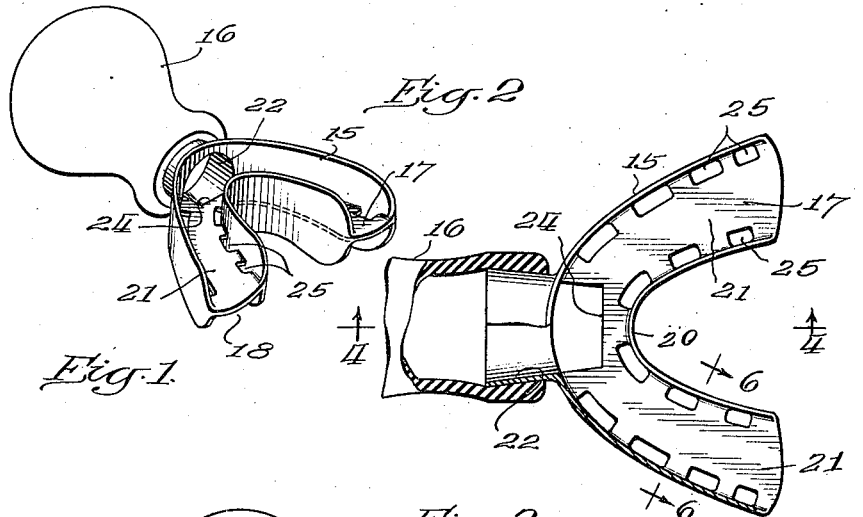
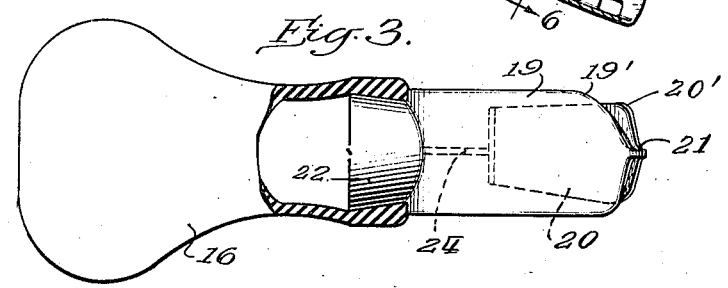
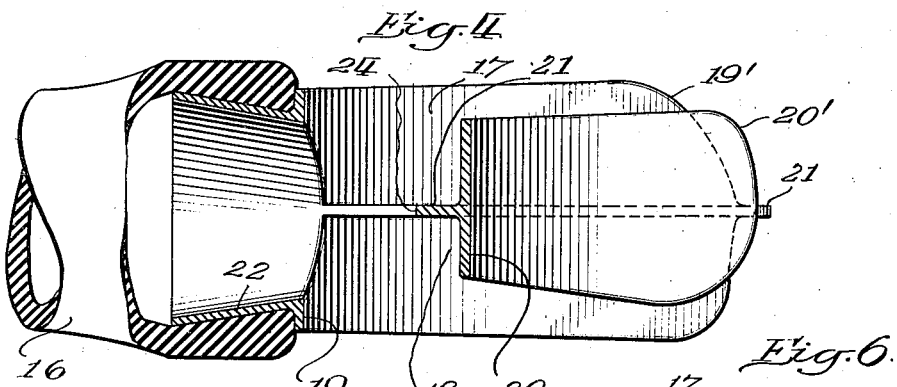
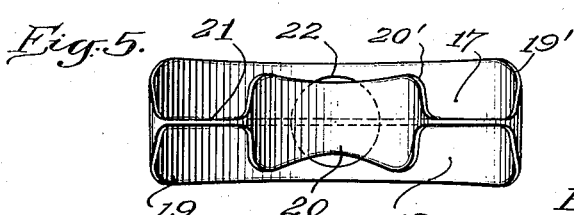
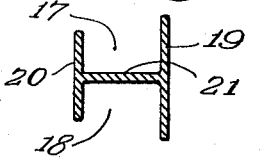
Inventor:
Edward P. Cressler Oct. 14, 1941. E. P. CRESSLER 2,258,883
RINSER FOR TEETH AND GUMS
Filed Feb. 21, 1938 2 Sheets-Sheet 2
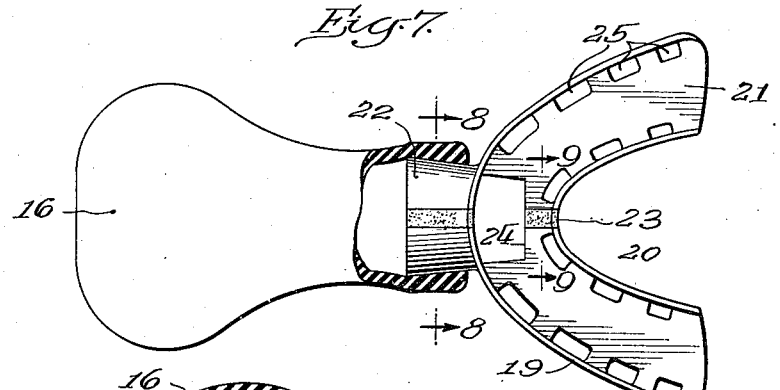
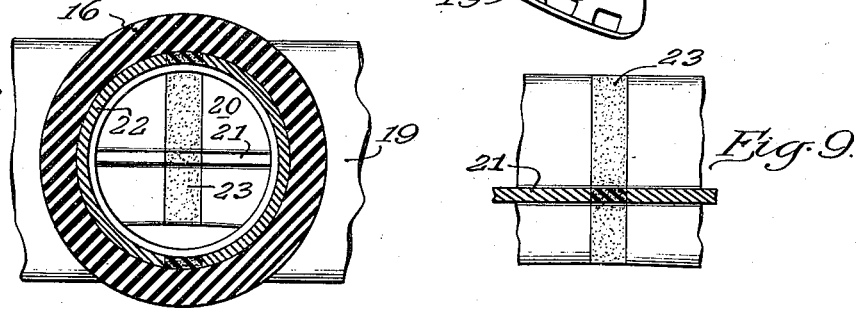
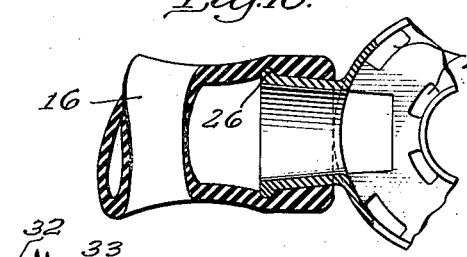
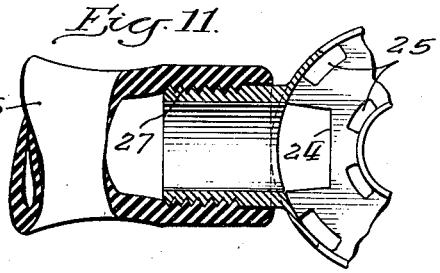
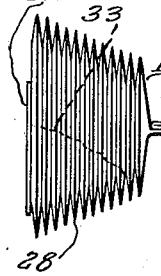
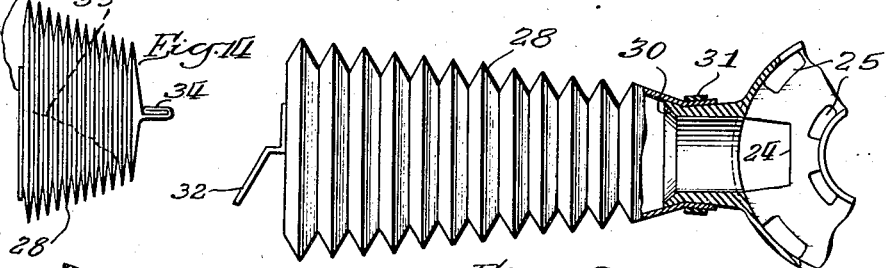
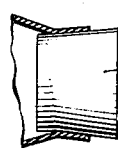
Inventor
Edward P. Cressler
By Bradbury, McCaleb & Hinkle
Attys.

Patented Oct. 14, 1941

2,258,883

UNITED STATES PATENT OFFICE 2,258,883

RINSER FOR TEETH AND GUMS

Edward P. Cressler, Newton, Kans.

Application February 21, 1938, Serial No. 191,711

3 Claims. (Cl. 128—231)

My invention relates to rinsers for teeth and gums and especially, although not necessarily, to hand-operated rinsers for professional and personal use.

One object of my invention is the provision of such a rinser which simultaneously cleans both the maxillary and the mandibular teeth.

Another object is the provision of a simple, inexpensive, unitary rinser.

A further object is a rinser which is arranged to discharge the cleansing liquid, withdraw it and re-discharge it in continuing cycles, whereby the same relatively small quantity of cleansing liquid may be employed for the entire cleansing operation. In this way the rinser need not be so wasteful of the cleansing liquid, if it be a relatively expensive one.

A still further object of my invention is the use of a rinsing trough which, while of relatively firm material, is arranged to yield to adapt itself to different sizes or shapes of jaws.

Still another object of my invention is the provision of a cartridge in which the rinsing liquid may be packaged and which cartridge itself becomes the bulb of the rinser for expelling and, if desired, indrawing and re-expelling the cleansing liquid.

The foregoing together with further objects, features and advantages of my invention are set forth in the following description of specific embodiments thereof and illustrated in the accompanying drawings wherein:

Fig. 1 is a perspective view of the rinser of my invention;

Fig. 2 is a plan view thereof;

Fig. 3 is a side view thereof;

Fig. 4 is a medial vertical section taken on the line 4—4 of Fig. 2;

Fig. 5 is an end elevation;

Fig. 6 is a cross section through the maxillary-mandibular troughs taken on the line 6—6 of Fig. 2;

Fig. 7 is a view similar to Fig. 2, but showing a modified form;

Fig. 8 is a transverse vertical section taken on the line 8—8 of Fig. 7;

Fig. 9 is a fragmentary transverse vertical section taken on the line 9—9 of Fig. 7;

Fig. 10 is a fragmentary plan section showing an alternative form of coupling between the bulb and the tray nipple;

Fig. 11 is a view similar to Fig. 10, but showing still another modification;

Fig. 12 is a fragmentary plan view of another form of rinser showing a bellows-like cartridge;

Fig. 13 is a fragmentary section of the mouth of the bellows cartridge showing a stopper or closure therefor for use in packaging and shipping; and Fig. 14 is a side elevation of the bellows cartridge of Fig. 12 in its collapsed position for packaging powder for the wash.

In the form shown in Figs. 1 to 6, my rinser consists chiefly in a trough portion 15 and a bulb 16. The trough portion 15 consists of an upwardly opening arch-shaped maxillary trough 17 and a similar downwardly facing arch-shaped mandibular trough 18. Preferably the troughs 17 and 18 are formed by an integral structure which is characteristically H-shaped in cross section, as best shown in Fig. 6. This structure consists of outer walls 19, inner walls 20 and a horizontally connecting web 21. A nipple 22 extends outwardly from the outer wall 19 and along the central line of the arch of the troughs. The nipple 22 receives the neck of the bulb 16.

Preferably the trough-forming structure and the nipple 22 are formed integrally from the same material. This material is preferably hard rubber or some other relatively hard composition, although it may be of metal or it may be formed of relatively soft and flexible rubber, or its equivalent. If the entire trough structure be of soft and flexible rubber, it has the advantage of more readily adapting a universal size to different sizes and shapes of jaws. However, the advantages of a relatively hard and stiff structure for the trough portions may be retained and still provide yielding adjustment for different sizes of jaws by including a section of softer and more flexible rubber between the right-hand and left-hand halves of the trough structure. Such a modification is shown in Figs. 7, 8 and 9, where a narrow section 23 of soft rubber is interposed along the vertical center plane, and this section may conveniently extend through the nipple 22 as well. This permits the ends of the troughs to be moved closer together or farther apart as required to fit the maxillary and mandibular shapes. It also permits a torsional movement of the structure of the maxillary-mandibular trough structure, whereby, for example, the rinser will adapt itself to an instance where the mandibular arch is narrower or shorter than the maxillary arch.

The rinser is so arranged that cleansing liquid expelled from the bulb is divided more or less equally between the trough 17 and the trough 18. I prefer to cut back the web 21 as indicated at 24. This facilitates the flow of the expelled liquid on to the lingual as well as the labial sides of the teeth. The ends of the outer and inner walls 19 and 20 are cut back on a curved contour, as indicated at 19' and 20', respectively, to avoid sharp edges which might cut the gums, palate or cheeks.

The rinser of the form shown in Figs. 1 to 9 is used as follows:

With the soft rubber bulb 16 fitted over the nipple 22, the bulb is filled with a liquid cleanser. This is preferably a mouth cleanser of the effervescent type, although any suitable liquid cleanser may be employed. The bulb may be filled with liquid by squeezing the bulb and drawing liquid in, or by holding the bulb in a vertical position and pouring liquid into it through the nipple 22.

With the bulb filled with a cleansing liquid, the trough portion of the rinser is inserted in the mouth so that the maxillary and mandibular teeth are received in the upper and lower troughs 17 and 18, respectively, the teeth closing against the web portion 21. The lips extend over the outer or labial wall 19. The tongue is raised to touch the hard palate or to touch the lingual or inner wall 20, and in either position the tongue will prevent the liquid being flushed down the throat.

The bulb is then alternately squeezed and permitted to recover.

When the bulb is squeezed the liquid is expelled through the nipple 22 and is more or less equally divided as between the upper and lower troughs 17 and 18. This is because the axis of the nipple 22 comes substantially in the plane of the web 21. That half of the expelled liquid which comes above the web 21 is about equally divided between the right and left side. Some of it goes between the maxillary teeth and the labial wall 15 washing the labial surfaces of the maxillary gum and teeth and passing between the teeth. Some of this liquid passes between the ends of the teeth and the web 21 and some passes through the cut-out 24 in the web 21. The liquid which passes between the teeth or beneath the teeth impacts the lingual or inner wall 20 of the trough and is splashed back on to the lingual surfaces of the teeth and gum, cleaning that side as well. That portion of the expelled liquid which passes on the underside of the web 21 in a similar manner acts to cleanse the mandibular teeth and gums.

The tongue, the cheeks and other inner surfaces of the mouth cooperate with the trough structure to close the ends, and fairly well to close the ends, top and bottom of the troughs, so that when the bulb is released most of the expelled liquid will be drawn back into the bulb and re-expelled. This cycle may be performed several times using the same initial charge of cleansing liquid.

If desired—and I find it preferable—the web 21 is perforated and these perforations are preferably located adjacent the inner and outer walls 19 and 20, as indicated at 25. This has the effect of greater turbulence of the cleansing liquid. The cleansing liquid forcibly ejected by the bulb may then splash from the walls 19 and 20 and from the teeth through the perforations 25. However, I find that satisfactory results are obtained without the perforations 25.

One fixed size of rinser will satisfactorily fit most adults, but I contemplate that a larger and a smaller size may be provided, and still smaller sizes for children. One given adult size may be made still more universal, however, by providing a flexible hinge action for the two arms of the C-shaped rinser tray portion. This may be effected, for example, by the flexible rubber section 23, described in connection with Figs. 7, 8 and 9, or by forming the entire tray portion of more flexible rubber.

In Fig. 10 I have shown a modified form of nipple which includes an encircling bead 26 at the end of the nipple to give a firmer attachment of the bulb to the nipple.

As shown in the modification of Fig. 11, the neck of the bulb may have internal screw threads to cooperate with external screw threads on the nipple, as indicated at 27. This has the advantage of facilitating the filling of the bulb with the initial charge of cleansing solution before the tray is attached.

I contemplate, as another modification, that the bulb may serve as a packaging cartridge for charges of prepared cleanser liquid. By this expedient the user may buy a carton of these filled cartridges, using one for each treatment and then discarding the cartridge.

To this end, the cartridge may either comprise a bulb somewhat as shown in the other figures, or, for the purpose of cheapening the container, the cartridge may be made of waxed paper, latex paper, or similar material, formed bellows-like, as indicated at 28 in Fig. 12. This packaging cartridge would initially carry a stopper 29, as shown in Fig. 13. When the cartridge is to be used, it is held in a vertical position, the stopper 29 removed from the top and the neck of the cartridge slipped over the nipple of the rinser tray. For this purpose the nipple would preferably have an outer flare or bead 30, and the neck of the cartridge would be contracted by a rubber band 31, if the material of the cartridge were not elastic. The charge would be expelled by pressing the outer end of the cartridge inwardly, and the cleansing liquid would be sucked back into the cartridge by pulling the end out again, which could conveniently be done by the aid of a tab 32 on the end wall.

Instead of being sold as a cartridge containing a charge of cleansing solution, the cartridge of Fig. 13 may be sold containing only an amount of a powder which, when mixed with water, gives the desired cleansing solution, such as an effervescent liquid. This permits the packaging cartridge to be shipped and sold in collapsed form, as shown in Fig. 14 which shows a quantity of powder 33. Instead of the stopper 29, the mouth of the cartridge may be sealed by folding it flat and rolling it upon itself, as indicated at 34. In that case when the cartridge is to be used, the flattened and sealed end is unrolled and opened up into a cylindrical mouth, the cartridge filled with water and the mouth of the cartridge slipped over the nipple of the rinser, as shown in Fig. 12.

In all of the forms shown, the bulb may be detached for the purpose of better cleansing the bulb, although in practice the cleansing liquid would probably be self-sterilizing. In the instance of the cartridge 28 of Fig. 12, the cartridge would probably be discarded so that no problem of cleaning would arise.

I contemplate that the rinser tray may be made from any of a large variety of materials, such as molded glass or stamped or molded metal, for example, but for economy of manufacture I prefer a light weight molded composition material.

While I have described and illustrated these specific embodiments of my invention, I contemplate that many changes and substitutions may be made without departing from the scope or spirit of my invention.

I claim:

1. The combination with a rinser comprising a plate contoured to fit within the mouth and adapted to lie horizontally between the mandibular and maxillary teeth at the center and on both sides of the mouth and having a wall rising above, and depending from, the plate along its lingual margin and a tubular stem extending forwardly from the plate and adapted to discharge liquid both above and below and both to the right and left, the stem being adapted to pass out between the lips and be sealed thereby— of a non-elastically collapsing packaging cartridge having a corkable neck, the neck being fitted over the end of the tubular stem to mount the cartridge on the rinser, whereby the cartridge, when filled and distended by liquid, may be collapsed to force the liquid inwardly through the stem to the rinser within the mouth.

2. As a rinser for teeth and gums, a Y-shaped structure to be placed within the mouth and comprising a U-shaped horizontal plate adapted to be disposed between and partition the maxillary teeth and the mandibular teeth at the front, right and left thereof, a vertical wall rising from, and depending from, the plate at the lingual margin thereof to partition the tongue from the lingual faces of the teeth, the outer margins of the plate being contoured to extend substantially into contact with the cheek and lips, and the plate being perforated along its outer margin, and a forwardly extending medially disposed tubular process adapted to pass out between, and be sealed by, the lips, and conformed at its outer end for reception of a liquid-containing bulb, the tubular process providing a passage which at its rear end discharges liquid, injected by the bulb, rearwardly against the wall, in such direction as to divide the discharged liquid as between above and below the plate and as between right and left, whereby the discharged liquid is deflected in four directions, namely, both above and below the plate and both to the right and to the left.

3. A rinser for teeth and gums comprising a structure to be placed within the mouth comprising a partition-like horizontal plate of arcuate jaw-shaped contour adapted to be received between the mandibular teeth and the maxillary teeth, a wall extending above and below the plate along its lingual edge and adapted to lie lingually of the teeth, the outer edge of the plate being contoured to extend into substantially sealing proximity to the cheeks and lips, the rinser also comprising a tubular structure forming a medially forwardly extending liquid passage, the tubular structure being adapted to pass out between, and be sealed by, the lips, the passage discharging liquid rearwardly both above and below the plane of the plate and against the forward portion of the wall in turn to divide the liquid stream right and left, whereby liquid discharged rearwardly through the passage is divided four ways, namely, both right and left and both above and below the plane of the plate, the outer end of the tubular structure being conformed to receive the discharge end of a bulb, the structure of the rinser being of relatively rigid material, but with a medial section of relatively flexible material inserted between its right and left halves to permit the rear ends to swing together and spread apart to fit different shapes of jaws.

EDWARD P. CRESSLER.